United States Patent
Uchida et al.

(10) Patent No.: US 6,684,630 B2
(45) Date of Patent: Feb. 3, 2004

(54) DIRECT-INJECTION SPARK-IGNITION ENGINE WITH A TURBO CHARGING DEVICE

(75) Inventors: Hiroyasu Uchida, Hiroshima (JP); Kazuaki Umezono, Hiroshima (JP); Mikihito Fujii, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 10/107,805

(22) Filed: Mar. 28, 2002

(65) Prior Publication Data

US 2002/0162320 A1 Nov. 7, 2002

(30) Foreign Application Priority Data

Mar. 30, 2001 (JP) ........................................ 2001-100574
Mar. 30, 2001 (JP) ........................................ 2001-100575

(51) Int. Cl.$^7$ ................................................ F01N 3/00
(52) U.S. Cl. .............................. 60/284; 60/280; 60/285
(58) Field of Search ........................ 60/274, 277, 280, 60/284, 285, 286, 300; 123/295, 299

(56) References Cited

U.S. PATENT DOCUMENTS

| | | | |
|---|---|---|---|
| 5,207,058 A | | 5/1993 | Sasaki et al. |
| 5,606,855 A | * | 3/1997 | Tomisawa ............... 60/274 |
| 5,642,705 A | | 7/1997 | Morikawa et al. |
| 6,044,642 A | | 4/2000 | Nishimura et al. |
| 6,141,960 A | * | 11/2000 | Takami et al. ............ 60/285 |
| 6,212,880 B1 | * | 4/2001 | Takano et al. ............ 60/277 |
| 6,240,721 B1 | * | 6/2001 | Ito et al. ............... 60/284 |
| 6,378,297 B1 | * | 4/2002 | Ito et al. ............... 60/284 |
| 6,412,276 B1 | * | 7/2002 | Salvat et al. ............ 60/280 |
| 6,536,209 B2 | * | 3/2003 | Fluga et al. ............. 60/284 |

FOREIGN PATENT DOCUMENTS

| | | |
|---|---|---|
| EP | 1004762 A1 | 5/2000 |
| EP | 1180584 A1 | 3/2003 |
| JP | 9-100724 A | 4/1997 |
| JP | 10-212987 A | 8/1998 |
| JP | 2000-120471 A | 4/2000 |
| JP | 2001-100574 | 3/2001 |
| JP | 2001-100575 | 3/2001 |
| WO | WO 02/18764 A1 | 3/2002 |

\* cited by examiner

*Primary Examiner*—Thomas Denion
*Assistant Examiner*—Tu M. Nguyen
(74) *Attorney, Agent, or Firm*—Nixon Peabody LLP; Donald R. Studebaker

(57) ABSTRACT

A direct-injection, spark-ignition engine of the present invention includes a turbo-charging device which promotes the temperature rise or activation of the exhaust-gas purification catalyst disposed downstream of a turbine during cold start. During engine cold start, the fuel injection by the fuel injector is divided into a leading fuel injection performed during the latter half of the compression stroke, prior to the ignition timing, and a trailing fuel injection performed during the expansion stroke, after the ignition timing. The amount of the intake-air and the amount of the fuel injection are so controlled that the air-fuel ratio in the combustion chamber during the combustion of the fuel by the leading fuel injection (a leading air-fuel ratio) is within the range of $2<\lambda<3$, and the air-fuel ratio in the combustion chamber during the combustion of the fuel by the trailing fuel injection (a total air-fuel ratio) is within the range of $1<\lambda<2$. This raises exhaust-gas temperature with heat from the combustion of the fuel injected in the compression stroke and by the oxidization of the unburned HG from turbine agitation, to raise the exhaust-gas temperature for promoting the temperature rise or activation of the exhaust-gas purification catalyst downstream of the turbine.

19 Claims, 10 Drawing Sheets

FIG. 2(a) DIVIDED INJECTION OF COMPRESSION-STROKE INJECTION AND EXPANSION-STROKE INJECTION
- UPSTREAM OF T/C    λ = 2.4
- DOWNSTREAM OF T/C  λ = 2.4
- UPSTREAM OF T/C    λ = 2.0
- DOWNSTREAM OF T/C  λ = 2.0
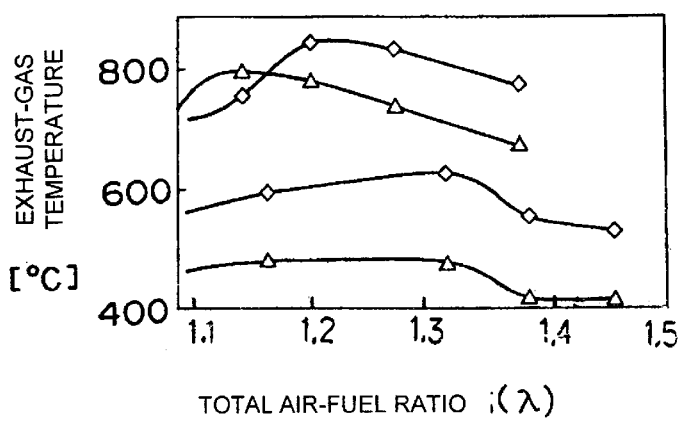
FIG. 2(b) DIVIDED INJECTION OF COMPRESSION-STROKE INJECTION AND EXPANSION-STROKE INJECTION
- λ = 2.4
- λ = 2.0
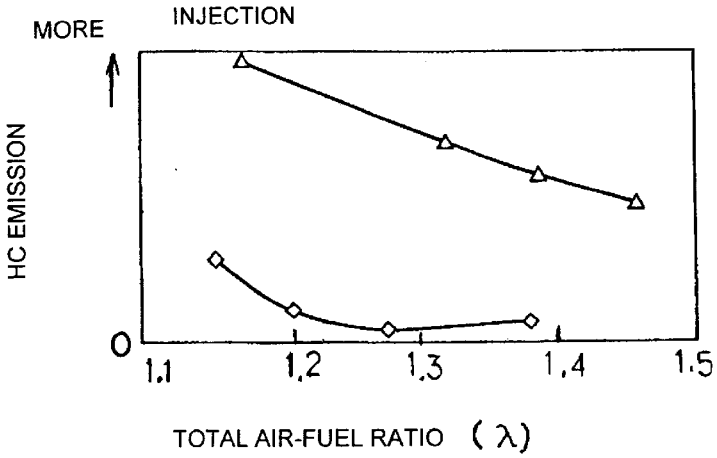

DIRECT-INJECTION SPARK-IGNITION ENGINE WITH A TURBO CHARGING DEVICE

FIELD OF THE INVENTION

The present invention relates to a direct-injection, spark-ignition engine having a turbo-charging device.

BACKGROUND OF THE INVENTION

Recent environmental requirements have necessitated improvements in fuel efficiency of automotive spark-ignition engines to improve energy savings and reduce $CO_2$ (carbon-dioxide) emissions. Under these requirements, a direct-injection, spark-ignition engine has been recently developed wherein fuel is directly injected into the combustion chamber to collect for stratification in the vicinity of the spark plug, for enhancing ignitionability, while causing the air-fuel ratio to have a lean stoichiometric air-fuel ratio for improving fuel efficiency.

An engine having a turbo-charging device which attains the increase in engine output by means of high intake-pressure, or high charging-efficiency caused by the efficient use of the high exhaust-gas pressure in the automotive engine, is also known. Such an engine has been noted in recent years for its effectiveness in providing a leaner air-fuel ratio.

Normally, a catalyst converter adopting an exhaust-gas purification catalyst is disposed in an exhaust-gas passage of an engine. The catalyst purifies pollutants such as NOx (nitrogen-oxides), HC (hydrocarbon), and CO (carbon-monoxide) included in the exhaust gas emitted from the combustion chamber of the engine of the automobile. The exhaust-gas purification catalyst generally has sufficient purification for an exhaust-gas having a temperature higher than its activation temperature and insufficient purification for the exhaust-gas having a lower temperature than the activation temperature.

Accordingly, when the engine starts in a cold state, the exhaust-gas purification catalyst is not activated for a certain time period after the engine starts. To reduce pollutants immediately after a cold start, the exhaust-gas purification catalyst is required to rise in temperature rapidly to attain early activation.

In an engine having a turbo-charging device, however, a turbine of the turbo-charging device is disposed in the exhaust-gas passage, and the catalyst converter is disposed downstream of the turbine. With this arrangement, there is a problem that the temperature rise, or the activation of the exhaust-gas purification catalyst, is delayed in cold-start because the turbine cools the exhaust gas to, for example, 100° C. To avoid this problem, the catalyst converter may be arranged upstream of the turbo-charging device. In this case, however, the catalyst converter is located immediately downstream of the combustion chamber, so that the exhaust-gas purification catalyst is unduly heated when the engine is fully heated, causing the problem of degradation in its durability due to the heat. In addition, the flow resistance due to the catalyst converter being located upstream of the turbine inevitably causes turbo lag, which impairs acceleration response in the turbo-charging device.

In view of the above problems, numerous solutions have been proposed. One such approach is a supercharged engine which lowers its turbine rotational speed during cold start to suppress heat transmission from the exhaust gas to the turbine for promoting temperature rise or activation of the exhaust-gas purification catalyst. See, Japanese Patent Publication No. H9-100724.

Another approach is disclosed in Japanese Patent Publication No. H10-212987, wherein in a direct-injection, spark-ignition engine the fuel being injected is divided in two, or the fuel is injected during the intake stroke and the compression stroke in cold start, to increase the temperature of the exhaust gas for promoting temperature rise or activation of the exhaust-gas purification catalyst.

Another direct-injection spark-ignition engine has been also proposed, in which fuel is injected during the intake stroke and in the compression stroke during a predetermined period after cold start, then fuel is injected in the compression stroke and in the expansion stroke after that period, to increase the temperature of the exhaust gas for promoting temperature rise or activation of the exhaust-gas purification catalyst. See, Japanese Patent Publication No. 2000-120471.

Recently, emission standards for automotive engines have become more strict, requiring the engines to activate their exhaust-gas purification catalysts within approximately 30 seconds after cold start. However, the conventional approaches to promoting activation of the exhaust-gas purification catalyst in cold start, as disclosed in Japanese Patent Publication Nos. H9-100724, H10-212987, and 2000-120471 described above, may be insufficient for promoting the temperature rise or activation of the exhaust-gas purification catalyst under these newer, stricter emission standards. Accordingly, the auto industry seeks more effective approaches for promoting activation of the exhaust-gas purification catalyst.

SUMMARY OF THE INVENTION

In view of the above, an object of the present invention is to provide an approach to sufficiently promote the temperature rise or activation of the exhaust-gas purification catalyst which is disposed downstream of the turbine in the exhaust-gas passage, in a direct-injection, spark-ignition engine having a turbo-charging device, during cold start.

In accomplishing this and other objectives of the present invention, there is provided a direct-injection, spark-ignition engine having a turbo-charging device. A piston compresses the injected fuel. A fuel injector directly injects fuel into a combustion chamber. An ignition device ignites the injected fuel. An exhaust-gas purification catalyst is disposed downstream of a turbine of the turbo charging device in an exhaust-gas passage. A fuel injection controller controls the amount and the timing of the fuel injection by the fuel injector. An ignition controller controls the ignition timing by the ignition device. An intake-air controller controls the amount of intake-air introduced in the combustion chamber. The fuel injection controller causes the fuel injector to divide fuel injection into a leading fuel injection during a leading period of an intake stroke of the piston prior to the ignition timing, and a trailing fuel injection during a trailing period of an expansion stroke after the ignition timing for a predetermined operating condition, where the exhaust-gas purification catalyst is to be activated. A fuel injection controller controls the fuel injector and the intake-air controller controls the amount of intake-air so that the excess air ratio λ in the combustion chamber is larger than 1, when the combustion of the fuel by the trailing fuel injection and the leading fuel injection completes.

Preferably, at low engine rotational speed and low engine load, the fuel injection controller controls the fuel injector and the intake-air controller controls the amount of intake-air, so that the excess air ratio λ in the combustion chamber is within the range of about 2 to 3 when the fuel of the leading fuel injection combusts.

Accordingly, the fuel injected by the leading fuel injection combusts under high volumetric efficiency (ηv) with a leaner air-fuel ratio of λ of 2 to 3 (this condition is referred to as "a leading combustion"). Additionally, fuel of the trailing fuel injection effectively combusts because of a leaner air-fuel ratio (exhaust-gas air-fuel ratio) of λ smaller than 1 at the combustion (this combustion is referred to as "a trailing combustion"). At this time, the trailing combustion raises the exhaust-gas temperature. Moreover, the turbine of the turbo-charging device agitates the exhaust-gas (this agitation is referred to as "turbine agitation"). The turbine agitation causes unburned HC in the exhaust-gas to oxidize (afterburn), and this exotherm further raises the exhaust-gas temperature. In this manner, exhaust-gas temperature is raised from heat generated by the trailing combustion and by the oxidization of the unburned HC from the turbine agitation to greatly raise the exhaust-gas temperature, for effectively promoting the temperature rise or activation of the exhaust-gas purification catalyst downstream of the turbine.

Preferably, the predetermined operating condition may be where the exhaust-gas purification catalyst is in an inactivated state. In the early stage of the inactivated state, the ignition controller may cause the ignition device to ignite at a timing after MBT by a predetermined period and the fuel injection controller may cause the fuel injector to inject fuel prior to the ignition timing. In the late stage of the inactivated state, the fuel injection controller may cause the fuel injector to divide fuel injection into a leading fuel injection during a leading period of the intake stroke prior to the ignition timing, and a trailing fuel injection during a trailing period of the expansion stroke, after the ignition timing the fuel injection controller controls the fuel injector and the intake-air controller controls the amount of intake-air, so that an exhaust-gas air-fuel ratio after the combustion of the fuel by trailing fuel injection is lean of the stoichiometric air-fuel ratio.

Accordingly, in the early stage of a condition where the exhaust-gas purification catalyst is in an inactivated state, or when engine temperature is relatively low, because the ignition timing is retarded to the timing after MBT, the exhaust-gas temperature rises to promote warm-up of the engine and temperature rise in the exhaust-gas purification catalyst. Under this condition, the temperature rise in exhaust-gas by the fuel injection in the expansion stroke, after the ignition timing (without ignition retard), is less than that by ignition retard. This is because relatively low temperature in the engine or the exhaust-gas in this condition causes poor combustionability of the fuel injected during the expansion stroke, and the agitation of the exhaust-gas by the turbine (referred to as turbine agitation) described later causes little oxidization of the unburned HC (afterburn).

On the other hand, in the late stage of a condition where the exhaust-gas purification catalyst is in an inactivated state, relatively high engine temperature or the exhaust gas and lean air-fuel ratio (with the sufficient amount of oxygen), maintain combustionability of the fuel by the trailing fuel injection (avoiding misfire), so that such a combustion raises the temperature of the exhaust-gas and the turbine agitation promotes oxidization of the unburned HC to further raises the exhaust-gas temperature. Under this condition, the temperature rise in exhaust-gas by ignition retard (without fuel injection in the expansion stroke) is less than that by the trailing fuel injection. In this manner, in cold start, the most effective approach to promoting the temperature rise in the exhaust-gas is selected, so that the exhaust-gas purification catalyst can be heated or activated early.

Other features, aspects, and advantages of the present invention will become apparent from the following description of the invention which refer to the accompanying drawings.

BRIEF DESCRIPTION OF THE DRAWINGS

FIG. 2(a) is a graph showing the change in the exhaust-gas temperature with respect to the leading air-fuel ratio and the total air-fuel ratio.

FIG. 2(b) a graph showing the change in the amount of the HC emission with respect to the leading air-fuel ratio and the total air-fuel ratio.

DETAILED DESCRIPTION OF THE INVENTION

Figure 1:
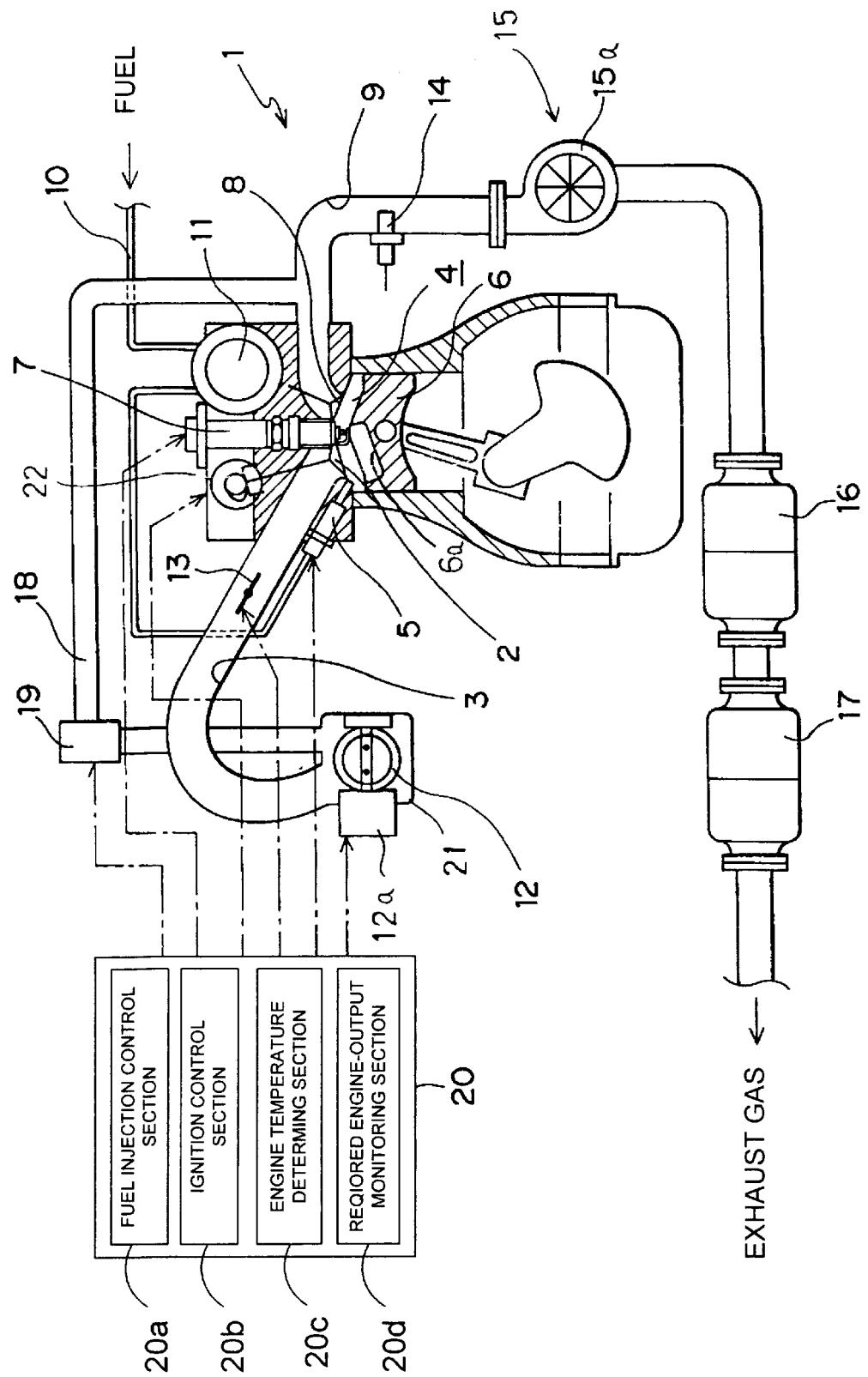
FIG. 1 is a schematic diagram showing the construction of a direct-injection, spark-ignition engine having a turbo-charging device according to the present invention.

FIG. 1 illustrates a direct-injection, spark-ignition engine with a turbo-charging device 1 according to a preferred embodiment (referred herein to as "engine 1"). Air is introduced into a combustion chamber 4 through an intake-air passage 3, when an intake valve 2 is open, i.e., before combustion. Then, a fuel injection device 5 (fuel injector) injects the fuel, for example, gasoline, into the air in combustion chamber 4 at the predetermined time to form the desired mixture.

The mixture is compressed by a piston 6, and then is ignited by a spark ignition device 7, i.e., a spark plug, to combust. The combust gas or exhaust is discharged into an exhaust-gas passage 9 while an exhaust valve 8 is open.

Fuel injector 5 is supplied with fuel from a high-pressure fuel pump 11 via a fuel supply passage 10. By means of high-pressure fuel pump 11, fuel is properly injected against the high pressure in the combustion chamber 4 during the late-stage of the compression stroke of the piston 6. The fuel injector 5 can be a swirl-type injector, and is so disposed that its fuel injection opening directly opens into combustion chamber 4. Additionally, fuel injector 5 is so disposed as to inject fuel into a cavity 6a formed on the top of piston 6 when the piston nears top-dead-center. Accordingly, fuel injected by fuel injector 5 during the late-stage of the compression stroke bounces off the cavity 6a to collect, i.e., to be stratified, in the vicinity of spark plug 7. Alternatively, the stratification of the injected fuel in the vicinity of the spark plug 7 may be caused by an airflow in combustion chamber 4. In this way, fuel or the mixture thereof, is stratified for high ignitionability, so that the resulting air-fuel ratio is highly lean to improve fuel efficiency.

In intake-air passage 3, located at the upstream side along the airflow, i.e., the flow of the intake air, is an electronic-controlled throttle valve 12 which regulates the airflow. A surge tank 21 for evening out the airflow, and a gas-flow control valve 13 for adjusting the airflow direction towards the combustion chamber 4 to produce swirl, are also disposed in intake-air passage 3. The electronic-controlled throttle valve 12 is driven by an electric actuator 12a acting on control signals from a control unit 20 (ECU), to regulate airflow into combustion chamber 4. Not shown in the drawing, disposed upstream of the electric-controlled throttle valve 12 in the intake-air passage 3, is an air cleaner for eliminating dust from the air, an airflow sensor for sensing the amount of the airflow, a blower (pump) of a turbo charger 15, which will be described herein, and an intercooler for cooling the air heated by the blower.

In the exhaust-gas passage 9, at the upstream side of the exhaust airflow of passage 3, a linear oxygen ($O_2$) sensor 14 senses the air-fuel ratio through the oxygen concentration in the exhaust gas. Alternatively, a conventional $\lambda O_2$ sensor, the output of which is reversed near $\lambda=1$, may be used. A turbine 15a of turbo charger 15, a first catalyst converter 16, and a second catalyst converter 17, are also disposed in exhaust-gas passage 9. First catalyst converter 16 can be a two-bed type, it's upstream bed is loaded with a three-way catalyst which purifies the pollutants such as NOx, HC, and CO, and its downstream bed is loaded with a NOx purification catalyst which mainly purifies NOx. The first catalyst converter 16 can also be a one-bed type, which is loaded only with a three-way catalyst.

Second catalyst converter 17 can be a one-bed type, which is loaded with a NOx purification catalyst which mainly purifies NOx. It should be appreciated that either exhaust-gas purification catalyst provides sufficient purification under a higher temperature than its activation temperature, and provides insufficient purification under a lower temperature than the activation temperature.

The engine 1 is equipped with an exhaust gas recirculation (EGR) passage 18 for performing EGR, or for partly returning the exhaust gas in the exhaust-gas passage 9 to the intake-air passage 3. In the EGR passage 18, an EGR regulating valve 19 for regulating the amount of the EGR gas is disposed. The intake valve 2 is variable in its operational timing via a variable valve-timing mechanism 22.

Control unit 20 is a control device for the overall control of the engine 1, and executes a variety of engine controls based on a variety of control data. This control data can include the amount of intake air, throttle opening, crank angle, coolant temperature (engine temperature), air-fuel ratio, etc., which are input into control unit 20. The control unit 20 uses the control data to execute the amount of the fuel injection (air-fuel ratio control) and the timing of the fuel injection by fuel injector 5, the timing of the ignition by spark plug 7 (ignition timing control), the opening of the electric-controlled throttle valve 12, the opening of the EGR regulating valve 19, opening of the gas-flow control valve 13, and the operational timing of the intake valve 2. That is, control unit 20 includes a fuel injection control section 20a for controlling the amount and the timing of fuel injection by the fuel injector 5, and an ignition control section 20b for controlling the ignition timing by the spark plug 7. Control unit 20 further includes a required engine-output monitoring section 20c for monitoring the required engine output, and an engine temperature determining section 20d for determining the engine temperature.

The following description relates to the fuel injection amount control (air-fuel ratio control), the fuel-injection timing control, and the ignition timing control during cold start, i.e., during the catalyst activation of engine 1, which are significant to the operation of the present invention. The other controls of engine 1 by control unit 20 are not described in detali, because such are well-known, conventional controls. The term "cold start" used in this specification refers to when the engine 1 starts in an unheated state at normal temperature, including a cold state.

In the engine control described above, fuel injection by fuel injector 5 is divided into a leading fuel injection performed during the latter half of the compression stroke of the piston prior to the ignition timing, and trailing fuel injection performed during the earlier half of the expansion stroke of the piston after the ignition timing in engine cold start, i.e., during the catalyst activation. The leading fuel injection may be performed during the intake stroke or the earlier half of the compression stroke. In this condition, the amount of fuel used during leading fuel injection is set to be equal to or more than that used during trailing fuel injection. Accordingly, the combustion of the fuel during leading fuel injection (referred to as leading combustion) and the combustion of the fuel during trailing fuel injection (referred to as trailing combustion) effectively raise the exhaust-gas temperature, and prevents the extra emission of unburned hydrocarbons in the trailing combustion.

In this manner, the starting timing of the trailing fuel injection is set after the top dead center (ATDC) of the piston within the range of about 30 to 90° ATDC crank angle (CA). This causes the leading combustion and the trailing combustion to raise the exhaust-gas temperature more effectively, and to prevent the extra emission of unburned hydrocarbons in the trailing combustion more effectively. Additionally, the ignition by the spark plug 7 is set prior to the top dead center position during the compression stroke. This prevents the degradation of fuel efficiency, while effectively promoting the temperature rise or the activation of the exhaust-gas purification catalyst in both catalyst converters 16 and 17.

The settings of the air-fuel ration and the excess air will now be described. The air-fuel ration in the combustion chamber 4 during combustion of the fuel at leading fuel injection (referred to as a leading air-fuel ratio) is preferably set with the range of $2<\lambda<3$. More particularly, the amount of fuel during leading fuel injection is set for a required engine output. On the other hand, the amount of air (or intake air) is controlled or increased in the intake-air passage 3 leading to the inlet of the combustion chamber 4, so that the excess air ratio $\lambda$ is preferably within the range of $2<\lambda<3$. This air amount control or increase is caused via a boost pressure control in the turbo-charging device 15. Alternatively, the amount of air may be controlled via opening period control or open/close timing control of the intake valve 2 by the variable valve-timing mechanism 22 with the electronic-controlled throttle valve 12 being fully opened or without the throttle valve. More preferably, excess air ratio $\lambda$ for the leading air-fuel ratio may be set within the range of $2.3<\lambda<2.7$. This effectively increases volumetric efficiency or intake-air charging efficiency $\eta v$.

The air-fuel ratio in the combustion chamber during combustion of the fuel at the trailing fuel injection, referred to as "a total air-fuel ratio" or "an exhaust-gas air-fuel ratio", is preferably set within the range of $1<\lambda<2$. That is, the amount of air and the amount of fuel injection are controlled. More preferably, the total air-fuel ratio is set so that the excess air ratio is within the range of $1.0<\lambda<1.3$, and still further preferably, $1.1<\lambda<1.2$. This ensures the temperature rise in the exhaust-gas during trailing combustion to promote the oxidization of unburned HC (afterburn) by the turbine agitation.

FIGS. 2(a) and (b) show the change in the exhaust-gas temperature and the HC emission with respect to the leading air-fuel ratio and the total air-fuel ratio. As is apparent from FIGS. 2 (a) and (b), a $\lambda$ of 2.4 causes higher exhaust-gas temperature downstream of the turbine, than a $\lambda$ of 2.0 for the leading air-fuel ratio (as with exhaust-gas temperature in the upstream of the turbine). Accordingly, for the leading air-fuel ratio, $\lambda$ is preferably set within the range of $2.3 \leq \lambda \leq 2.7$ as described above, that is, an expanded range of $\lambda=2.4$ with an upper margin and a lower margin smaller than the upper margin (with an upper margin of 0.3 and a lower margin of 0.1). For the total air-fuel ratio, the highest exhaust-gas temperature is attained with the range of about $1.1<\lambda<1.3$, specifically, with $1.1<\lambda<1.2$. Accordingly, for the total air-fuel ratio, $\lambda$ is preferably set within the range of $1.0<\lambda<1.3$, and with a margin on the richer side, as described above, more preferably to $1.1<\lambda<1.2$.

In this manner, the trailing fuel injection during the expansion stroke after ignition in cold start, i.e., during catalyst activation, raises the exhaust-gas temperature as a result of the combustion of the injected fuel. Part of the fuel does not burn and remains in the exhaust gas in the form of unburned HC. The exhaust gas including the unburned HC, however, is agitated by the turbine 15a of the turbo charger 15 while passing through the turbine, i.e., during turbine agitation. The turbine agitation causes the unburned HC to oxidize with oxygen in the exhaust gas or afterburn. The oxidization of the unburned HC generates heat to further raise the exhaust-gas temperature. In this way, the temperature rise of the exhaust-gas promotes the temperature rise or activation of the exhaust-gas purification catalyst in both catalyst converters 16 and 17.

In this case, a sufficient amount of oxygen is required for effectively burning the fuel during the trailing injection, and for effectively oxidizing the unburned HC with the turbine agitation. Therefore, to ensure the required amount of oxygen for the burn or the oxidization above, a lean air-fuel ratio is provided in cold start. The leading air-fuel ratio, of course, is leaner than this. It should be noted, that such an air-fuel control, where the air-fuel ratio is set to be leaner than the stoichiometric air-fuel ratio in cold start, is completely novel over conventional air-fuel ratio controls.

Figure 3A:
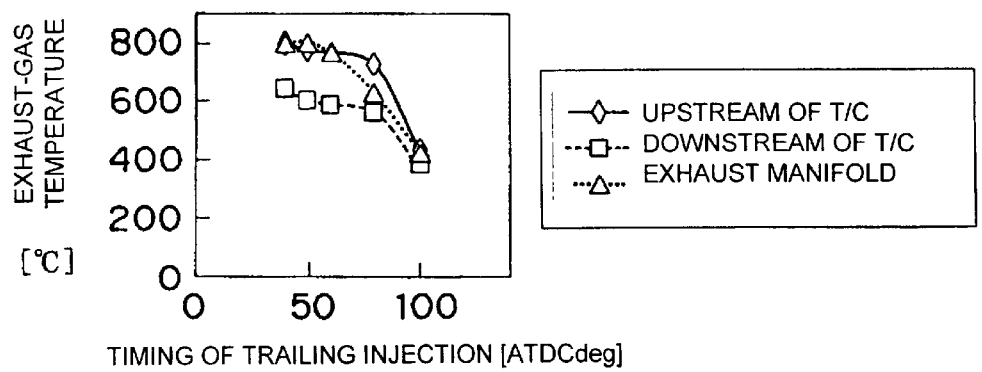
FIG. 3(a) is a graph showing the change in the exhaust-gas temperature with respect to the trailing fuel injection timing.
Figure 3B:
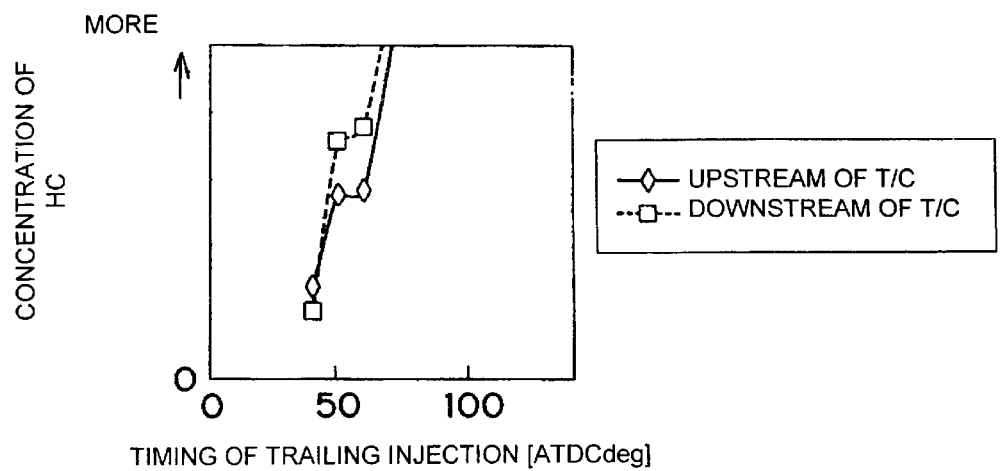
FIG. 3(b) is a graph illustrating the change in the HC concentration with respect to the trailing fuel injection timing.
Figure 3C:
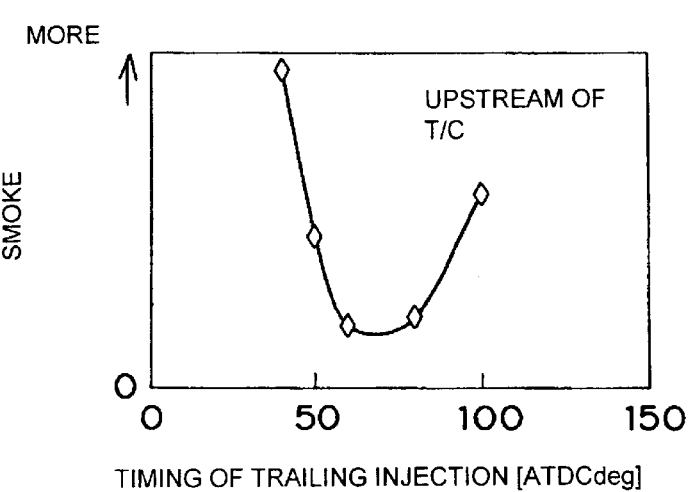
FIG. 3(c) is a graph showing the change in the amount of smoke, with respect to the trailing fuel injection timing.
Figure 4A:
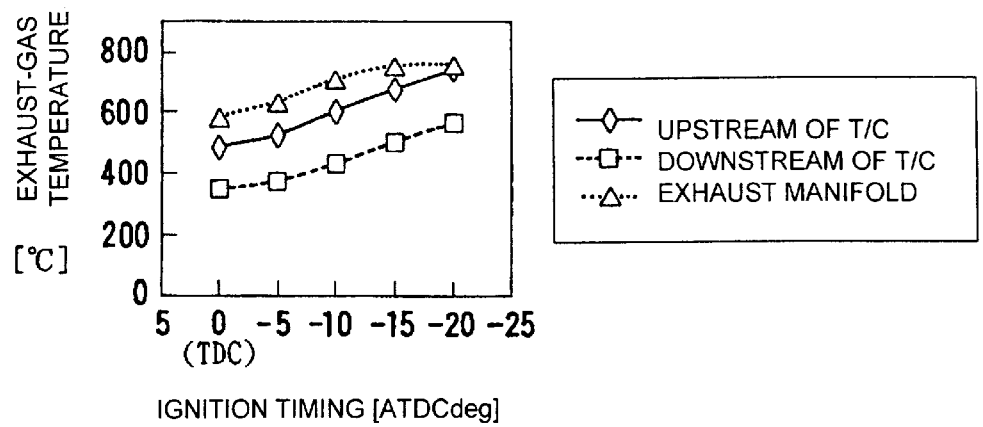
FIG. 4(a) is a graph showing the change in the exhaust-gas temperature with respect to the ignition timing.
Figure 4B:
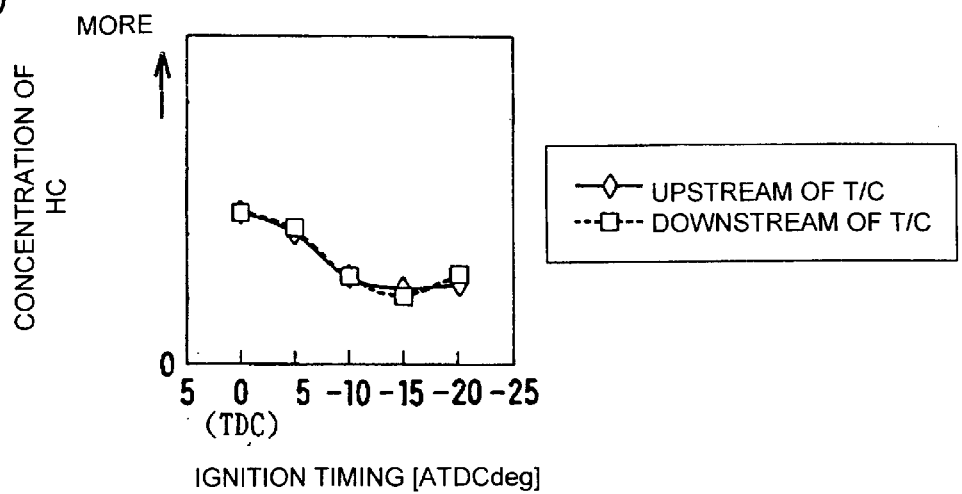
FIG. 4(b) is a graph showing the change in the HC concentration with respect to the ignition timing.
Figure 4C:
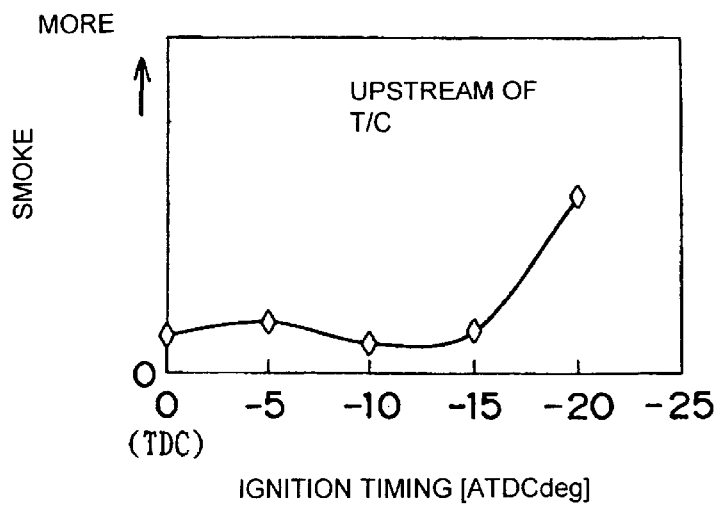
FIG. 4(c) is a graph illustrating the change in the amount of smoke with respect to ignition timing.

The features and advantages of the fuel injection control and the ignition timing control in cold start described above will now be described in detail based upon empirical data. FIGS. 3(a), (b), and (c) show the change in the exhaust-gas temperature, HC concentration, and the amount of smoke generated with the injection timing of the trailing fuel injection (referred to as trailing injection timing) for the condition where the leading fuel injection and the trailing fuel injection are performed without ignition retard, referred to as "activation by supercharging and expansion-stroke injection", respectively. FIGS. 4(a), (b), and (c) show the change in the exhaust-gas temperature, HC concentration, and the amount of smoke generated with the ignition timing for the condition where the conventional divided injections, or the intake-stroke injection and the compression-stroke injection are performed with the ignition retarded to a timing after MBT (minimum spark advance of best torque), referred to as "activation by supercharging and ignition retard", respectively.

As will be apparent from FIGS. 3(a), (b), and (c), the trailing injection timing of approximately 40 to 80° ATDC keeps a high exhaust-gas temperature downstream of the turbine. That is, trailing injection timing is preferably set within the range approximately from 30 to 90° ATDC (30 to 90° CA) in cold start, to which is added slight margins, as described above. More preferably, trailing injection timing may be set within the range of approximately 50 to 60° ATDC in cold start. A trailing injection timing later than 60° ATDC abruptly increases the HC concentration, and a trailing injection timing earlier than 50° ATDC abruptly increases the amount of smoke.

As will be apparent from FIGS. 4(a), (b), and (c), an ignition timing ranging approximately from 10 to 20° ATDC (that is, −10 to −20° advanced) keeps a high exhaust-gas temperature downstream of the turbine. That is, the ignition timing set within the approximate range of about 10 to 20° ATDC further raises the exhaust-gas temperature in cold start, though the fuel efficiency is degraded by a small amount. More preferably, the ignition timing is set within the approximate range of about 10 to 15° ATDC in the early-stage of catalyst activation, because an ignition timing later than 15° ATDC abruptly increases the amount of smoke.

Figure 5A:
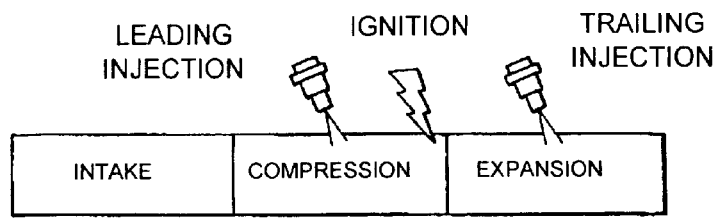
FIG. 5(a) is a time chart illustrating fuel injection timing in cold start.
Figure 5B:
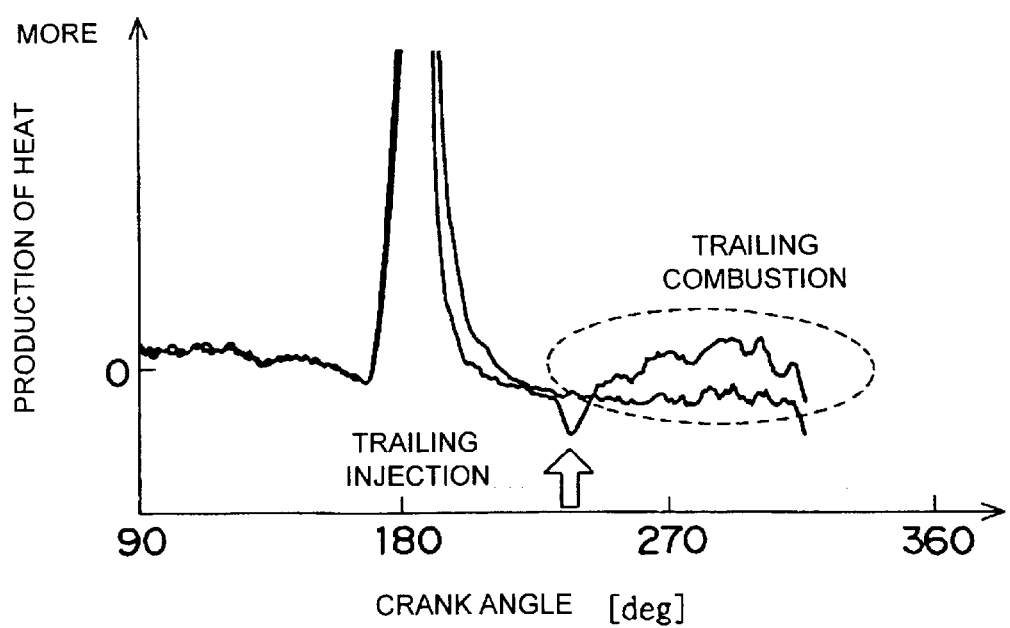
FIG. 5(b) a graph showing the change in heat generation with respect to the fuel injection timing shown in FIG. 5(a).

The effect of the increase in the exhaust-gas temperature by the expansion-stroke injection and the effect of the increase in the exhaust-gas temperature by the turbine agitation will be described in detail based on the empirical data. With the leading fuel injection in the compression stroke prior to the ignition and the trailing fuel injection in the expansion stroke after the ignition in the manner shown in FIG. 5(a), fuel combustion generates heat at approximately 240 to 320° CA as shown in FIG. 5(b). Accordingly, it is proven that the fuel injected in the expansion stroke effectively burns. For reference, FIG. 5(b) also depicts the temperature change in the case where the trailing fuel injection is not performed.

Figure 6A:
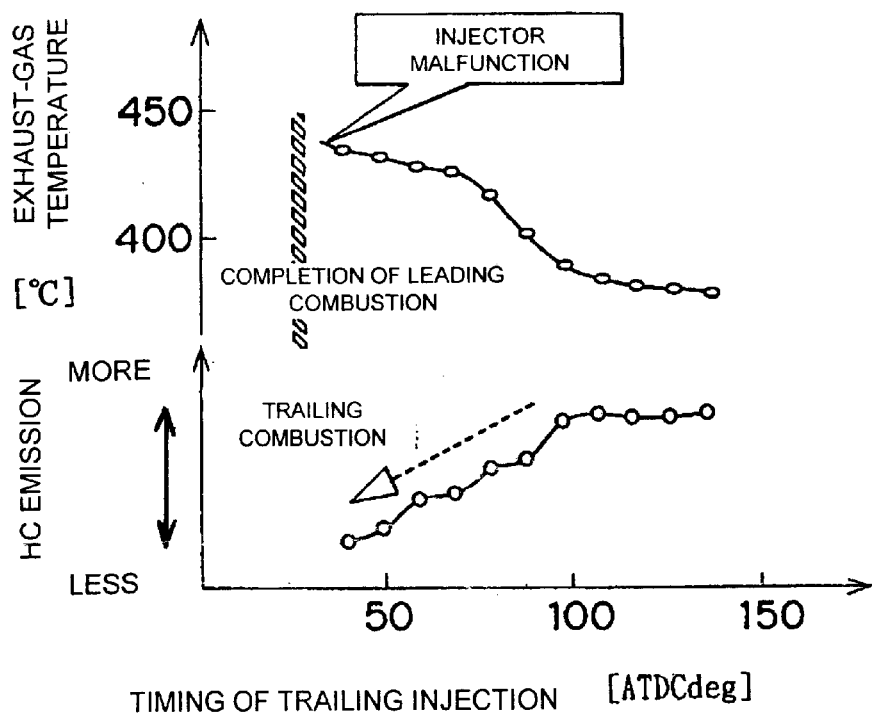
FIG. 6(a) is a graph showing the change in the exhaust-gas temperature and the HC emission with respect to the trailing fuel injection timing.

As shown in FIG. 6(a), where the trailing fuel injection timing in the expansion stroke is later than 40° ATDC, the exhaust temperature rises and the HC emission is reduced as the trailing fuel injection timing advances, or as it approaches the top-dead-center of the expansion stroke with high in-cylinder gas-temperature. However, the trailing fuel injection prior to the combustion completion of the fuel by the leading injection (referred to as completion timing of the leading combustion), or during combustion of the fuel, produces a considerable amount of carbon and can cause malfunction of fuel injector 5. Accordingly, the trailing-injection timing should be set to a timing after the completion timing of the leading combustion. In this example, the completion timing of the leading combustion is approximately 25° ATDC.

Figure 6B:
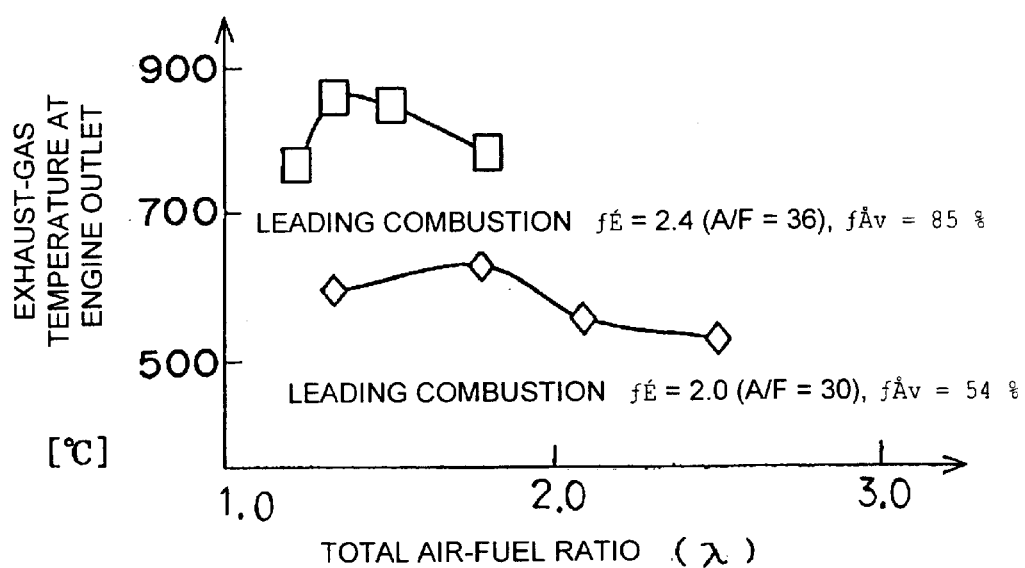
FIG. 6(b) is a graph showing the change in the exhaust-gas temperature in the outlet of the engine with respect to the leading air-fuel ratio and the total air-fuel ratio.

FIG. 6(b) shows the change in the exhaust-gas temperature at the outlet of the engine (in the upstream portion of the turbine in the exhaust passage) with the air-fuel ratio of the fuel by the leading injection in combustion (leading air-fuel ratio), and with the air-fuel ratio of the fuel by the trailing injection in combustion (total air-fuel ratio). As will be apparent from FIG. 6(b), the exhaust-gas temperature at the outlet of the engine depends on the leading air-fuel ratio and the total air-fuel ratio. Particularly, the exhaust-gas temperature at the outlet of the engine rises for the leaner leading air-fuel ratio (at least approximately up to the air-fuel ratio of 36). In addition, the exhaust-gas temperature at the outlet of the engine reaches the maximum value for a specified total air-fuel ratio depending on the leading air-fuel ratio. That is, the temperature does not reach the maximum value for other than the specified air-fuel ratio. Accordingly, the total air-fuel ratio should be favorably set according to the leading air-fuel ratio so as to maximize the exhaust-gas temperature at the outlet of the engine.

Figure 7A:
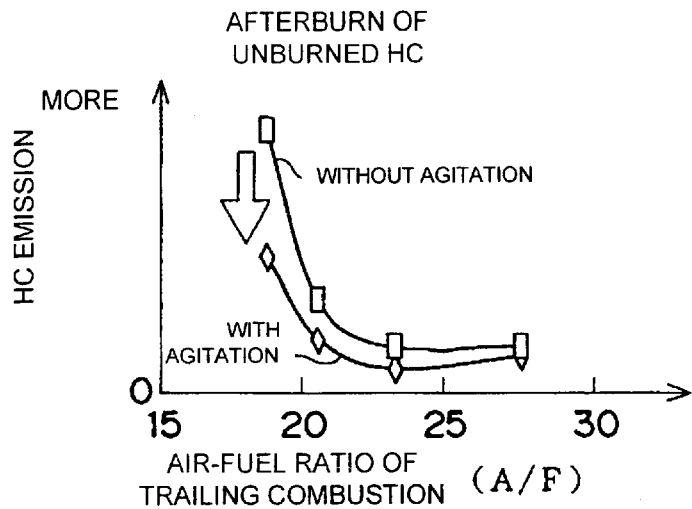
FIG. 7(a) is a graph showing the change in the HC emission with respect to the total air-fuel ratio with turbine agitation and without turbine agitation.
Figure 7B:
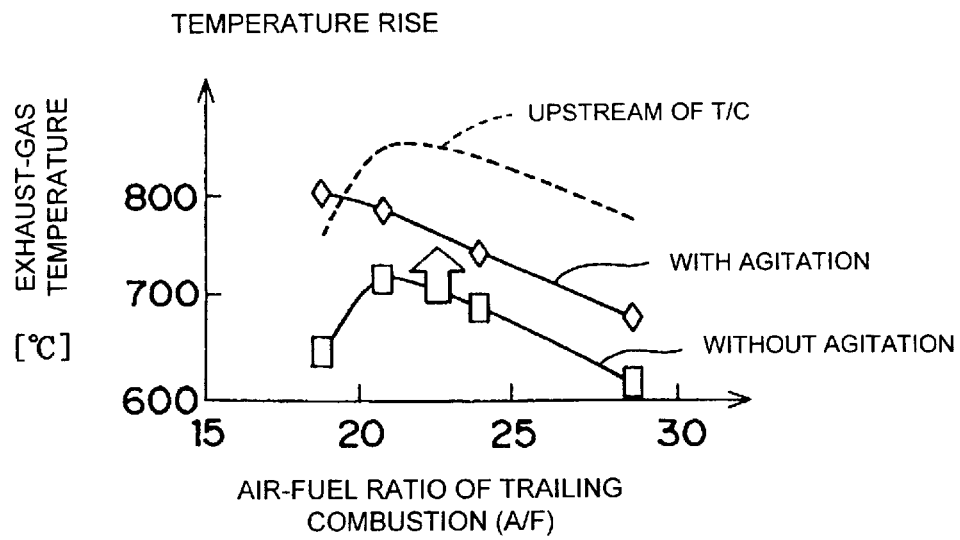
FIG. 7(b) is a graph showing the change in the exhaust-gas temperature with respect to the total air-fuel ratio with turbine agitation and without turbine agitation.

FIGS. 7(a) and (b) illustrate the measurements of the amount of the HC emission and the exhaust-gas temperature downstream of the turbine, with and without turbine agitation, respectively. As will be apparent from FIGS. 7(a) and (b), less HC emission and higher exhaust-gas temperatures are attained with turbine agitation than without turbine agitation. This is because turbine agitation causes the unburned HC in the exhaust gas to oxidize, i.e., afterburn.

Figure 8A:
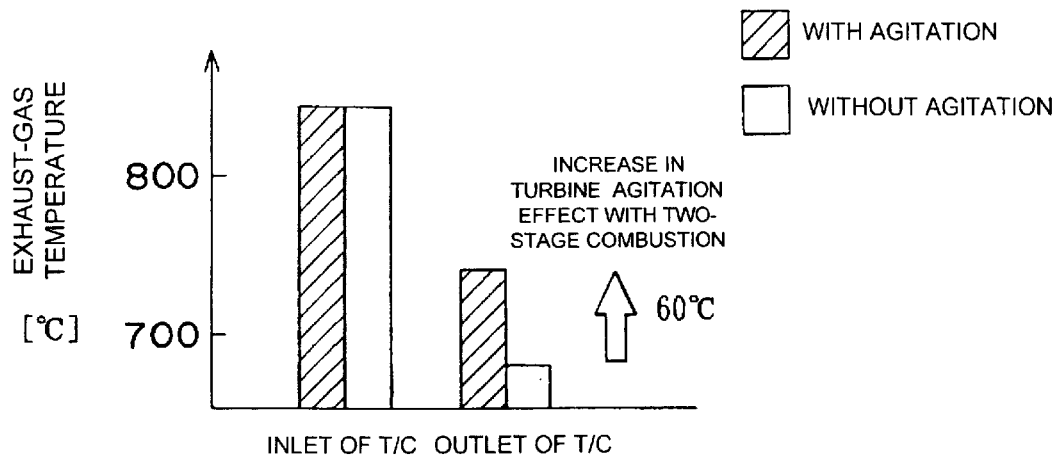
FIG. 8(a) is a bar graph comparing the exhaust-gas temperature with turbine agitation to that without the turbine agitation of the turbine and downstream of the turbine.
Figure 8B:
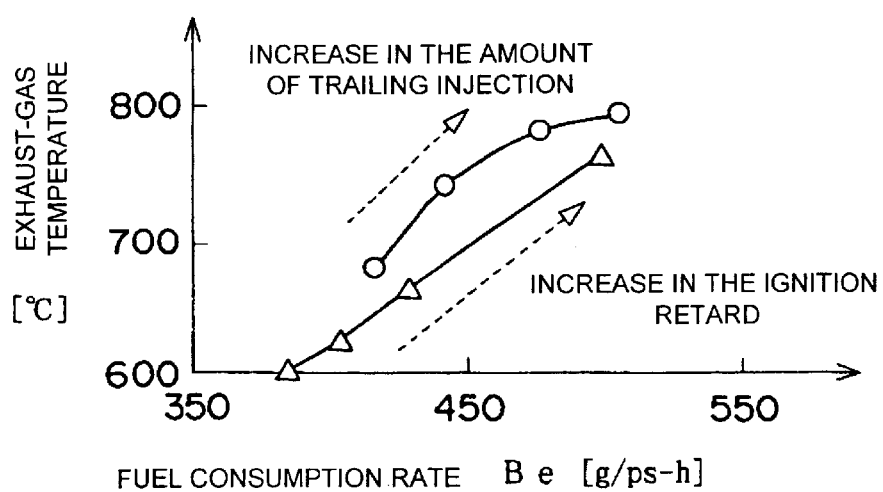
FIG. 8(b) is a graph showing the relation between the exhaust-gas temperature and the fuel consumption rate for trailing fuel injection and for ignition retard.

FIG. 8(a) shows the exhaust-gas temperature upstream of the turbine and downstream of the turbine, with and without turbine agitation, respectively. As will be apparent from FIG. 8(a), in this example, turbine agitation raises the exhaust-gas temperature by 60° C. FIG. 8(b) shows the relationship between the exhaust-gas temperature and the fuel consumption rate, for trailing fuel injection and for ignition retard, respectively. As is apparent from FIG. 8(b), for the same exhaust-gas temperature, trailing fuel injection results in a lower fuel consumption rate, and hence a better fuel economy, than ignition retard. In addition, for the same fuel consumption rate, the trailing fuel injection provides a higher exhaust temperature than ignition retard. Accordingly, in cold start, the trailing fuel injection (expansion-stroke injection) advantageously raises the exhaust-gas temperature to promote temperature rise, or activation of the exhaust-gas purification catalyst, in contrast to ignition retard.

Figure 9:
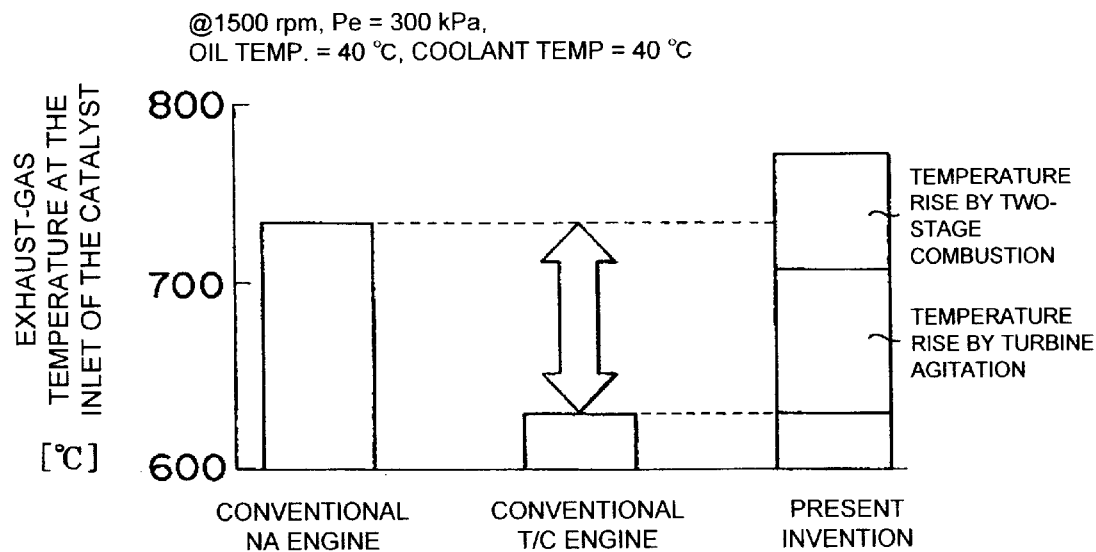
FIG. 9 is a bar graph comparing the exhaust-gas temperatures in the inlet of the catalyst converter for the engine having a turbo-charging device according to the present invention, and a conventional engine with a turbo-charging device, and a conventional non-supercharged engine.

FIG. 9 graphs measurements of the exhaust-gas temperature at the inlet of the catalyst converter (exhaust-gas purification catalyst), for an engine having a turbo-charging device 1, according to the preferred embodiment of the present invention, a conventional engine with a turbo-charging device, and a conventional, non-supercharged engine. In the measurements, engine rotational speed is 1500 rpm, brake mean effective pressure is 300 kPa, lubrication-oil temperature is 40° C., and coolant temperature is 40° C., which simulate the conditions for low engine rotational speed and low engine load. As shown in FIG. 9, the engine 1 according to the preferred embodiment attains an exhaust-gas temperature approximately 140° C. higher than the conventional engine with the turbo-charging device, and approximately 30° C. higher than the conventional, non-supercharged engine. The conventional engine with the turbo-charging device attains an exhaust-gas temperature approximately 110° C. lower than the conventional non-supercharged engine. That is, engine 1 according to the preferred embodiment of the present invention, achieves sufficiently high exhaust-gas temperature in combination with the effect of trailing fuel injection (two-stage combustion effect) and the effect of turbine agitation (turbine agitation effect).

Depending on the specifications of the engine, however, the exhaust-gas temperature may not rise by a large amount because of less combustionability of the injected fuel and inactive oxidization of the unburned HC by the turbine agitation, in the case where fuel is injected during the expansion stroke of the piston after ignition under low engine temperature, or low exhaust-gas temperature. Also, the increase in the amount of HC emission overloads the three-way catalyst in the first catalyst converter 16. In such a case, different fuel injection control and air-fuel ratio control can be affected during the early stage of catalyst activation advantageously achieves the desired temperature rise in the exhaust-gas to promote activation of the exhaust-gas purification catalyst. Such control will be described herein.

During the period from cold start of the engine 1 to a predetermined timing of injection-mode shift, this period being defined as the early stage of catalyst activation, the fuel injector 5 injects fuel only prior to the ignition, while the spark plug 7 ignites after MBT by a predetermined period, or ignition is retarded to occur after MBT by the predetermined period. The timing of injection-mode shift is determined based upon engine temperature or coolant temperature. Particularly, the timing of injection-mode shift is when fuel by trailing injection, which will be described further herein, sufficiently ensures its combustionability and the engine temperature rises to cause unburned HC to oxidize by the turbine agitation.

In the early stage of catalyst activation, the exhaust-gas purification catalysts in both catalyst converters 16 and 17 are not activated, and the engine temperature and the exhaust-gas temperature are relatively low. In this condition, fuel injection is divided in two. One is the intake-stroke injection performed during the intake stroke, and the other is the compression-stroke injection performed during the latter half of the compression stroke. The total amount of the injected fuel of the intake-stroke injection and the compression-stroke injection are determined in the following manner. Firstly, the acceleration pedal stroke and the engine rotational speed are used to determine a target torque for the engine, with reference to a map or other criteria. Next, the target torque and the amount of the intake air are used to determine the total amount of the injected fuel, with reference to the map or other criteria. The exhaust-gas air-fuel ratio, or total air-fuel ratio is set to be equal to or rich of the approximately stoichiometric air-fuel ratio ($\lambda=1$ or $\lambda<1$). Here, $\lambda$ represents the excess air ratio in the early stage of catalyst activation.

In the meantime, while the exhaust-gas purification catalysts in both catalyst converters 16 and 17 are not activated after the injection mode is shifted, this period is defined as the late-stage of catalyst activation, the fuel amount control, the fuel-injection timing control, and the air-fuel ratio controls are performed in the above-mentioned manner. Then, retard of the ignition timing is canceled, or ignition by spark plug 7 is set to occur prior to the top dead center position of the piston during the compression stroke.

The reason for the above controls, by which the ignition timing is retarded without fuel injection during the expansion stroke after ignition in the early-stage of catalyst activation, while the retard of the ignition timing is canceled, or is set to occur prior to the top dead center during the compression stroke with fuel injection in the expansion stroke after ignition in the late-stage of catalyst activation, will be described further.

Generally, retard of an ignition to occur after MBT, (minimum advance for best torque), reduces engine output or mechanical energy. That is, the conversion rate of thermal energy produced by the fuel combustion into mechanical energy is reduced, and the reduced amount of energy remains in the exhaust gas in the form of thermal energy. This raises the exhaust-gas temperature. Thus, ignition is retarded after MBT in the early-stage of catalyst activation to promote temperature rise of the engine or the exhaust gas. This temperature rise of the exhaust gas promotes the temperature rise or activation of the exhaust-gas purification catalyst in both catalyst converters 16 and 17. In this case, however, engine output is reduced. To compensate for this reduction, the air-fuel ratio is set to be approximately equal to or richer than the stoichiometric air-fuel ratio.

After transition from the early-stage to the late-stage of catalyst activation, ignition retard is canceled, or is set to occur prior to the top dead center of the piston during the compression stroke, while the trailing fuel injection starts. Then, the ratio of the amount of the trailing fuel injection to the amount of the leading fuel injection is increased gradually, up to 20%, for example, because an abrupt increase in the amount of trailing fuel injection increases the amount of unburned HC emission.

Figure 10A:
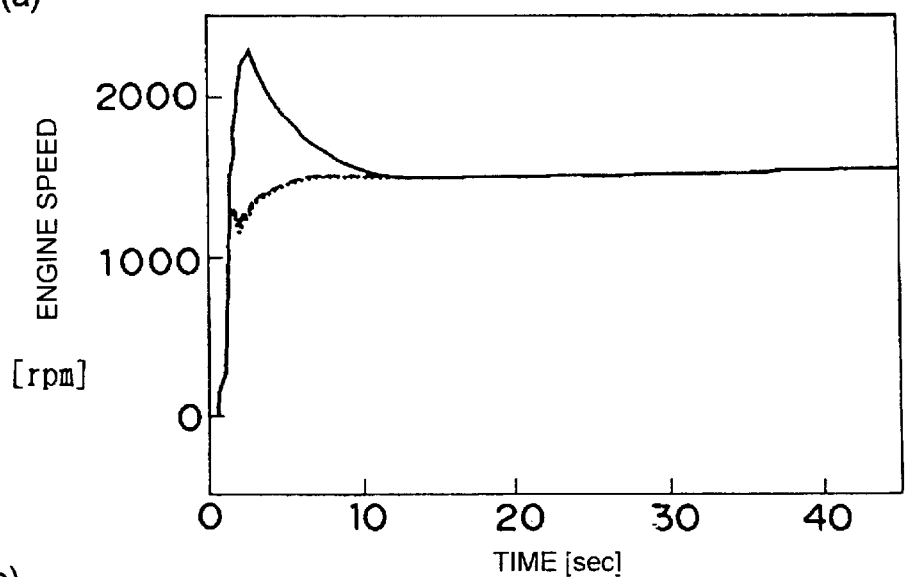
FIG. 10(a) is a graph showing the change in engine rotational speed with respect to time.
Figure 10B:
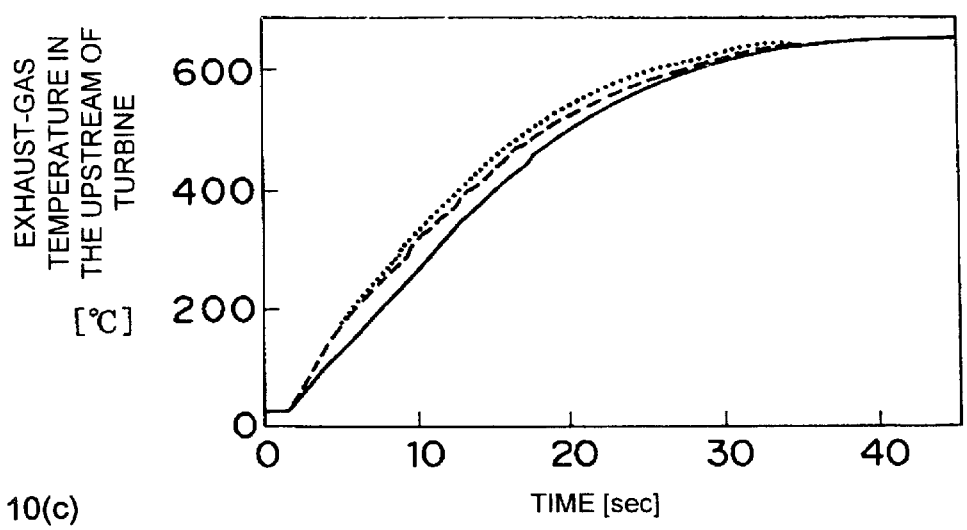
FIG. 10(b) is a graph chart showing the change in the exhaust-gas temperature upstream of the turbine with respect to time.

The features and advantages of the fuel injection control and the ignition timing control in cold start described above will now be described in detail based upon empirical data. FIGS. 10(a), (b), and (c) illustrate the measurements of engine rotational speed, exhaust-gas temperature upstream of the turbine, and the exhaust-gas temperature downstream of the turbine for two conditions, respectively. The first condition is to maintain early-stage of catalyst activation, or to retard the ignition after MBT with the intake-stroke injection and the compression-stroke injection, over the engine-operational period, referred to as "activation by supercharging and ignition retard". The other condition is to maintain late-stage of catalyst activation, or to cancel the retard of the ignition timing with the leading fuel injection and the trailing fuel injection, over the engine operational period, referred to as "activation by supercharging and expansion-stroke injection".

For reference, FIGS. 10(a), (b), and (c) also depict engine rotational speed, exhaust-gas temperature upstream of the turbine, and exhaust-gas temperature downstream of the turbine in a non-supercharged engine without a turbocharger, for ignition retard after MBT with the intake-stroke injection and the compression stroke injection, referred to as "activation by non-supercharging and ignition retard". In FIGS. 10(a), (b), and (c), the broken lines indicate the measurements of the activation by supercharging and ignition retard, the solid lines indicate the measurements of activation by supercharging and expansion-stroke injection, and the dotted lines indicate the measurements of activation by non-supercharging and ignition retard, respectively.

Figure 10C:
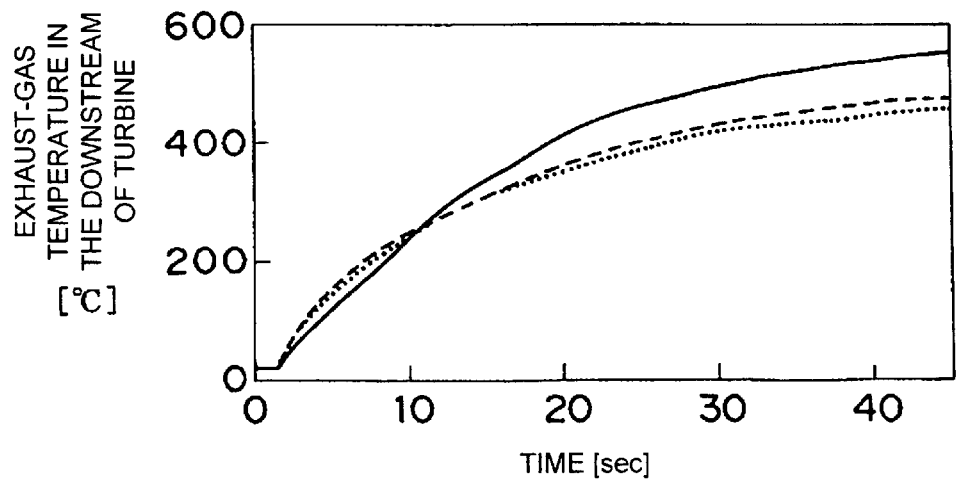
FIG. 10(c) is a graph chart showing the change in the exhaust-gas temperature downstream of the turbine with respect to time.

As will be apparent from FIG. 10(c), within a specified period of 11 to 12 seconds after the engine starts in a cold state, activation by supercharging and ignition retard causes a higher temperature in the exhaust-gas downstream of the turbine than the activation by supercharging and expansion-stroke injection. In contrast, after the specified period, activation by supercharging and expansion-stroke injection causes a higher temperature in the exhaust-gas downstream of the turbine than activation by supercharging and ignition retard. In view of the empirical facts, in the engine 1 according to this embodiment, the specified timing is set to the injection-mode shift timing, before which (or in the early-stage of catalyst activation) the activation is caused by supercharging and ignition retard, and after which (or in the late-stage of catalyst activation) the activation is caused by supercharging and expansion-stroke injection, for effectively promoting the temperature rise or activation of the exhaust-gas purification catalyst.

While particular embodiments of the present invention have been illustrated and described in relation to particular embodiments thereof, it will be obvious to those skilled in the art that many other variations and modifications and other uses will become apparent. It is preferred, therefore, that the present invention be limited not by the specific disclosure herein, but only by the appended claims.

What is claimed is:

1. A direct-injection, spark-ignition engine having a turbocharging device including a turbine, comprising:

a fuel injector for directly injecting fuel into a combustion chamber of the engine;

a piston for compressing the injected fuel;

an ignition device for igniting the injected fuel;

an exhaust-gas purification catalyst disposed downstream of said turbine of the turbo charging device in an exhaust-gas passage of the engine;

a fuel injection controller for controlling an amount and a timing of the fuel injection by the fuel injector;

an ignition controller for controlling a ignition timing by the ignition device;

an intake-air controller for controlling an amount of intake-air introduced into the combustion chamber, wherein said fuel injection controller causes the fuel injector to divide fuel injection into a leading fuel injection during a leading period of an intake stroke of the piston, prior to the ignition timing, and a trailing fuel injection during a trailing period of an expansion stroke of the piston after the ignition timing, during a predetermined operating condition where the exhaust-gas purification catalyst is to be activated during engine cold start, and said fuel injection controller controls the fuel injector and the intake-air controller controls the amount of intake-air so that the excess air ratio in the combustion chamber is larger than 1 when the combustion of the fuel by the trailing fuel injection and the leading fuel injection completes, so that the turbine agitating the exhaust gas generates an after-burn causing a temperature rise of the exhaust gas being discharged to the exhaust gas purification catalyst disposed at the downstream side of said turbine.

2. The direct-injection spark-ignition engine of claim 1, wherein the predetermined operating condition occurs when said exhaust-gas purification catalyst is in an inactivated state, and wherein in an early stage of the inactivated state, said ignition controller causes the ignition device to ignite after MBT by a predetermined period and said injection controller causes the fuel injector to inject fuel prior to the ignition timing, and wherein in a late stage of the inactivated state, and said fuel injection controller controls the fuel injector and said intake-air controller controls the amount of intake-air so that an exhaust-gas air-fuel ratio after the combustion of the fuel by the trailing fuel injection is lean of the stoichiometric air-fuel ratio.

3. The direct-injection spark-ignition engine of claim 1, wherein at low engine rotational speed and low engine load, said fuel injection controller controls the fuel injector and said intake-air controller controls the amount of intake-air so that the excess air ratio in the combustion chamber is within the range of about 2 to 3, when the fuel of said leading fuel injection combusts.

4. The direct-injection spark-ignition engine of claim 3, further comprising a required engine-output monitoring device for monitoring the required engine output, wherein said intake-air controller is disposed in an intake-air passage leading to an inlet of the combustion chamber, and said fuel injection controller determines the amount of fuel by said leading fuel injection based on the required engine-output.

5. The direct-injection spark-ignition engine of claim 3, wherein said fuel injection controller controls the fuel injector and said intake-air controller controls the amount of intake-air, so that the excess air ratio in the combustion chamber is less than 2, when the fuel delivered by said trailing fuel injection combusts.

6. The direct-injection spark-ignition engine of claim 3, wherein said fuel injection controller sets the amount of fuel delivered by said leading fuel injection to be equal to or greater than the fuel delivered by said trailing fuel injection.

7. The direct-injection spark-ignition engine of claim 3, wherein said fuel injection controller sets the starting timing of the trailing fuel injection to be within the range of about 30° to 90° ATDC crank angle.

8. The direct-injection spark-ignition engine of claim 3, wherein said ignition controller sets an ignition timing by the ignition device to occur prior to the top-dead-center position of the piston during the compression stroke.

9. A direct-injection spark-ignition engine with a turbocharging device, comprising:
a fuel injector for directly injecting fuel into a combustion chamber;
a piston for compressing the injected fuel;
an ignition device for igniting the injected fuel;
an exhaust-gas purification catalyst disposed downstream of a turbine of the turbo charging device in an exhaust-gas passage of the engine;
a fuel injection controller for controlling an amount and a timing of fuel injection by said fuel injector;
an ignition controller for controlling a ignition timing by said ignition device; and
an intake-air controller for controlling an amount of intake-air introduced in the combustion chamber, wherein during an early stage, wherein said exhaust-gas purification catalyst is in an inactivated state, said ignition controller causes the ignition device to ignite at a timing after MBT by a predetermined period and said fuel injection controller causes the fuel injector to inject fuel during a latter half of the compression stroke and in a period prior to the period before the ignition timing so that an exhaust-gas air-fuel ratio is equal to or rich of the stoichiometric air-fuel ratio, and wherein during a late stage, where the exhaust-gas purification catalyst is in an inactivated state said fuel injection controller causes the fuel injector to divide fuel injection into a leading fuel injection during a leading period of an intake stroke of the piston, prior to the ignition timing, and a trailing fuel injection during a trailing period of an expansion stroke of the piston, after the ignition timing, and said fuel injection controller controls the fuel injector and said intake-air controller controls the amount of intake-air, so that the exhaust-gas air-fuel ratio after the combustion of the fuel by the trailing fuel injection is lean of the stoichiometric air-fuel ratio.

10. A direct-injection spark-ignition engine with a turbocharging device including a turbine, comprising:
a fuel injector which directly injects fuel into a combustion chamber;
a piston for compressing the injected fuel;
an ignition device which ignites the injected fuel;
an exhaust-gas purification catalyst disposed downstream of said turbine of said turbo charging device in an exhaust-gas passage of the engine;
an ignition controller which controls a ignition timing by said ignition device;
an intake-air controller which controls the amount of intake-air introduced into the combustion chamber; and
a fuel injection controller which controls said fuel injector to perform divided injection of a leading fuel injection into a leading period prior to the ignition timing during an intake stroke of the piston, the amount of which causes an excess air ratio $\lambda$ in the combustion chamber to be within the range of about 2 to 3 with the amount of intake-air controlled by said intake-air controller when the fuel by the leading fuel injection combusts, and a trailing fuel injection during a trailing period of an expansion stroke of the piston after the ignition timing, the amount of which causes the excess air ratio $\lambda$ in the combustion chamber to be within the range of about 1 to 2, with the amount of intake-air controlled by said intake-air controller when the fuel injected during said trailing fuel injection combusts, during a predetermined operating condition where said exhaust-gas purification catalyst is to be activated at low engine rotational speed and low engine load during engine cold start, so that the turbine agitating the exhaust gas generates an after-burn causing a temperature rise of the exhaust gas being discharged to the exhaust gas purification catalyst disposed at the downstream side of said turbine.

11. A direct-injection spark-ignition engine with a turbocharging device, comprising:
a fuel injector which directly injects fuel into a combustion chamber;
a piston for compressing the injected fuel;
an ignition device which ignites the injected fuel;
an exhaust-gas purification catalyst disposed downstream of a turbine of the turbo charging device in an exhaust-gas passage of the engine;
an intake-air controller which controls an amount of intake-air introduced in the combustion chamber;

an ignition controller which controls said ignition device to ignite at a timing after MBT by a predetermined period during an early stage of a condition where the exhaust-gas purification catalyst is in an inactivated state, and ignite at a timing prior to MBT during a late stage of a condition where said exhaust-gas purification catalyst is in an inactivated state; and a fuel injection controller which controls said fuel injector to perform fuel injection, the amount of which causes an exhaust air-fuel ratio to be rich of the stoichiometric air-fuel ratio with the amount of intake-air controlled by said intake-air controller in the early stage of the condition where said exhaust-gas purification catalyst is in an inactivated state, and to divide fuel injection into a leading fuel injection during a leading period of an intake stroke of the piston prior to the ignition timing, and a trailing fuel injection during a trailing period of an expansion stroke of the piston after the ignition timing, the amount of which causes an exhaust-gas air-fuel ratio after the combustion of the fuel by the trailing fuel injection to be lean of the stoichiometric air-fuel ratio with the amount of intake-air controlled by said intake-air controller during the late stage of the condition, where said exhaust-gas purification catalyst is in an inactivated state.

12. A direct-injection spark-ignition engine with a turbo-charging device including a turbine, comprising:
   a fuel injector for directly injecting fuel into a combustion chamber;
   a piston for compressing the injected fuel;
   an ignition device for igniting the injected fuel;
   an exhaust-gas purification catalyst disposed downstream of said turbine of the turbo charging device in an exhaust-gas passage;
   a fuel injection controller for controlling an amount and a timing of the fuel injection by the fuel injector;
   an ignition controller for controlling a ignition timing by the ignition device;
   an intake-air controller disposed in an intake-air passage leading to an inlet of the combustion chamber for controlling an amount of intake-air introduced into the combustion chamber; and
   a required engine-output monitoring device for monitoring the required engine output, wherein said fuel injection controller causes the fuel injector to divide fuel injection into a leading fuel injection during a leading period of an intake stroke of the piston prior to the ignition timing, and a trailing fuel injection during a trailing period of an expansion stroke of the piston after the ignition timing, during a predetermined operating condition where the exhaust-gas purification catalyst is to be activated at low engine rotational speed and low engine load activated during engine cold start, and said fuel injection controller controls the fuel injector based on the required engine-output and said intake-air controller controls the amount of intake-air so that the excess air ratio in the combustion chamber is within the range from 2 to 3 when the fuel delivered by the leading fuel injection combusts, and the excess air ratio in the combustion chamber is within the range of about 1 to 2 when the fuel delivered by the trailing fuel injection combusts, so that the turbine agitating the exhaust gas generates an after-burn causing a temperature rise of the exhaust gas being discharged to the exhaust gas purification catalyst disposed at the downstream side of said turbine.

13. The direct-injection spark-ignition engine of claim 12, further comprising an engine temperature determining device for determining the engine temperature, wherein the early stage of the inactivated state and the late stage of the inactivated state are defined based on the engine temperature.

14. The direct-injection spark-ignition engine of claim 12, wherein during the late stage of the inactivated state, said fuel injection controller controls the amount of the leading fuel injection and the amount of the trailing fuel injection so that the ratio of the amount of the trailing fuel injection to the amount of the leading fuel injection increases gradually.

15. The direct-injection spark-ignition engine of claim 12, wherein during the early stage of the inactivated state, said ignition controller sets the ignition timing of the ignition device to occur after a top-dead-center position of the piston during the compression stroke.

16. The direct-injection spark-ignition engine of claim 15, wherein during the late stage of the inactivated state, said ignition controller causes the ignition device to ignite prior to the top-dead-center of the compression stroke, and said fuel injection controller controls the amount of the leading fuel injection and the amount of the trailing fuel injection so that the ratio of the amount of the trailing fuel injection to the amount of the leading fuel injection increases gradually.

17. A direct-injection spark-ignition engine with a turbo-charging device, comprising:
   a fuel injector for directly injecting fuel into a combustion chamber;
   a piston for compressing the injected fuel;
   an ignition device for igniting the injected fuel;
   an exhaust-gas purification catalyst disposed downstream of a turbine of the turbo charging device in an exhaust-gas passage;
   a fuel injection controller for controlling an amount and a timing of the fuel injection by the fuel injector;
   an ignition controller for controlling a ignition timing by the ignition device;
   an intake-air controller disposed in an intake-air passage leading to an inlet of the combustion chamber for controlling an amount of intake-air introduced into the combustion chamber; and
   a required engine-output monitoring device for monitoring the required engine output, wherein said fuel injection controller causes the fuel injector to divide fuel injection into a leading fuel injection during a leading period of an intake stroke of the piston prior to the ignition timing, and a trailing fuel injection during a trailing period of an expansion stroke of the piston after the ignition timing, during a predetermined operating condition where the exhaust-gas purification catalyst is to be activated at low engine rotational speed and low engine load, and said fuel injection controller controls the fuel injector based on the required engine-output and said intake-air controller controls the amount of intake-air so that the excess air ratio in the combustion chamber is within the range from 2 to 3 when the fuel delivered by the leading fuel injection combusts, and the excess air ratio in the combustion chamber is within the range of about 1 to 2 when the fuel delivered by the trailing fuel injection combusts, wherein during the early stage of the inactivated state, said fuel injection controller causes the fuel injector to inject fuel during the latter half of the compression stroke and in a period prior thereto, and during the late stage of the inactivated state, said fuel injection controller causes the fuel injector to perform trailing fuel injection during the earlier half of the expansion stroke.

18. A direct-injection spark-ignition engine with a turbo-charging device, comprising:

a fuel injector for directly injecting fuel into a combustion chamber;

a piston for compressing the injected fuel;

an ignition device for igniting the injected fuel;

an exhaust-gas purification catalyst disposed downstream of a turbine of the turbo charging device in an exhaust-gas passage;

a fuel injection controller for controlling an amount and a timing of the fuel injection by the fuel injector;

an ignition controller for controlling a ignition timing by the ignition device;

an intake-air controller disposed in an intake-air passage leading to an inlet of the combustion chamber for controlling an amount of intake-air introduced into the combustion chamber; and a required engine-output monitoring device for monitoring the required engine output, wherein said fuel injection controller causes the fuel injector to divide fuel injection into a leading fuel injection during a leading period of an intake stroke of the piston prior to the ignition timing, and a trailing fuel injection during a trailing period of an expansion stroke of the piston after the ignition timing, during a predetermined operating condition where the exhaust-gas purification catalyst is to be activated at low engine rotational speed and low engine load, and said fuel injection controller controls the fuel injector based on the required engine-output and said intake-air controller controls the amount of intake-air so that the excess air ratio in the combustion chamber is within the range from 2 to 3 when the fuel delivered by the leading fuel injection combusts, and the excess air ratio in the combustion chamber is within the range of about 1 to 2 when the fuel delivered by the trailing fuel injection combusts, wherein during the early stage of the inactivated state, said fuel injection controller controls the fuel injector and said intake-air controller controls the amount of intake-air so that the exhaust-gas air-fuel ratio is equal to or rich of the stoichiometric air-fuel ratio.

19. A direct-injection spark-ignition engine with a turbo-charging device, comprising:

a fuel injector for directly injecting fuel into a combustion chamber;

a piston for compressing the injected fuel;

an ignition device for igniting the injected fuel;

an exhaust-gas purification catalyst disposed downstream of a turbine of the turbo charging device in an exhaust-gas passage of the engine;

a fuel injection controller for controlling an amount and a timing of fuel injection by the fuel injector;

an ignition controller for controlling a ignition timing of said ignition device;

an intake-air controller disposed in an intake-air passage leading to an inlet of the combustion chamber for controlling an amount of intake-air introduced in the combustion chamber; and an engine-output monitoring device for monitoring the required engine output, wherein during an early stage of a condition where the exhaust-gas purification catalyst is in an inactivated state said ignition controller causes the ignition device to ignite after MBT by a predetermined period and said fuel injection controller causes said fuel injector to inject fuel during a latter half of a compression stroke of the piston and in a period prior to the period before the ignition timing, so that the excess air ratio $\lambda$ in the combustion chamber is equal to or smaller than 1, and during a late stage of a condition where the exhaust-gas purification catalyst is in an inactivated state, said fuel injection controller causes said fuel injector to divide fuel injection into a leading fuel injection during a leading period of an intake stroke of the piston, prior to the ignition timing, and a trailing fuel injection during a trailing period of an expansion stroke of the piston, after the ignition timing, and said fuel injection controller controls the fuel injector based on the required engine-output and said intake-air controller controls the amount of intake-air so that an excess air ratio $\lambda$ in the combustion chamber is within the range of about 2 to 3 when the fuel injected during said leading fuel injection combusts, and the excess air ratio $\lambda$ in the combustion chamber is within the range of about 1 to 2, when the fuel injected during said trailing fuel injection combusts.

* * * * *